United States Patent [19]
Bandimere

[11] Patent Number: 5,335,627
[45] Date of Patent: Aug. 9, 1994

[54] ANIMAL RESTRAINT DEVICE AND METHOD OF USING SAME

[75] Inventor: John K. Bandimere, Carlsbad, Calif.

[73] Assignee: Randall K. Inc., San Diego, Calif.

[21] Appl. No.: 59,708

[22] Filed: May 10, 1993

[51] Int. Cl.5 ............................................ A01K 27/00
[52] U.S. Cl. .................................................... 119/856
[58] Field of Search ................. 119/106, 109, 96, 725, 119/726, 769, 792, 793, 795, 797, 801, 856, 863, 907

[56] References Cited

U.S. PATENT DOCUMENTS

| | | | |
|---|---|---|---|
| 1,614,083 | 1/1927 | Plantico | 119/793 |
| 2,187,021 | 1/1940 | Everson | 119/792 |
| 3,867,905 | 2/1975 | Vail, Jr. | 119/793 |

Primary Examiner—Thomas Price
Attorney, Agent, or Firm—Bernard L. Kleinke; Jerry R. Potts

[57] ABSTRACT

An animal harness having a rectangularly shaped slotted plate for resting on the back of the animal rearwardly of its forward shoulders and a single control strap adapted to be attached to a leash and for cooperating with pairs of rings for defining right and left foreleg slip loops. A pair of restraining straps pass through the rings and are coupled to the plate by a latching arrangement, cooperate with the slip loops to form a block and tackle arrangement which utilizes a pulling force exerted by the animal, to exert a restraining force across the upper foreleg muscles of the animal when the leash is held in a substantially stationary position.

17 Claims, 3 Drawing Sheets

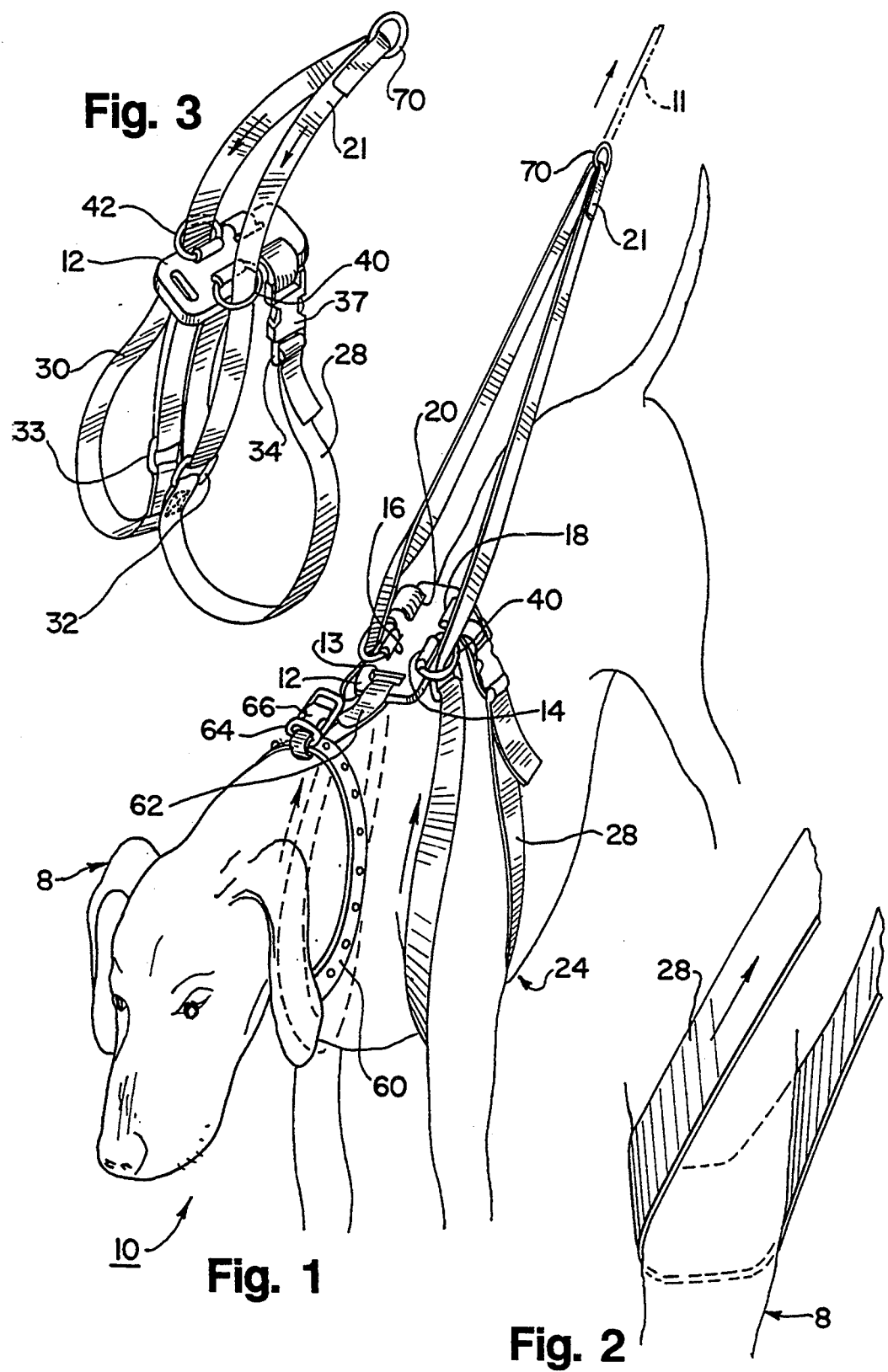

ANIMAL RESTRAINT DEVICE AND METHOD OF USING SAME

DESCRIPTION

1. Technical Field

The present invention relates in general to an improved animal restraining device and a method of using it. The invention more particularly relates to an animal harness which may be used with a control leash to facilitate restraining a large animal, and which can be used according to a novel method.

2. Background Art

There have been many different types and kinds of animal restraining devices for controlling dogs and other types of four-legged animals. For example, reference may be made to the following U.S. Pat. Nos.: 1,685,435; 2,187,021; 2,233,397; 2,458,484; 2,464,867; 2,534,727; 2,605,744; 2,670,712; 2,798,458; 2,826,172; 3,310,034; 3,769,939; 3,994,264; 4,060,056; 4,597,359; and 4,964,369.

As disclosed in the foregoing mentioned patents, various harnesses are attached to an animal by straps, collars and loop devices. In this regard, a leash attached to the harness can be grasped to cause the animal to be controlled or restrained.

While such harnesses may restrain animals, they have not proven to be entirely satisfactory as such devices typically act to inhibit the animal from straining against the leash by either choking or pinching the animal with its collar or by causing some other pain inducing force to cause the animal to terminate leash resistance.

For example, U.S. Pat. No. 4,964,369 describes a leash attachable dog harness which includes a pair of cords or cables. The cables are attached to a front neck part of a neck collar and extend in a pair of loops under the foreleg pits of the animal and upwardly forwardly through a pair of rings on a rear neck part of the collar to a common attachment point. The attachment point is adapted to be secured to the leash removably. In use, when the animal strains against the leash, the cables are pulled upwardly into the foreleg pits of the animal and forwardly through the rings to cause the restraint cables to impose a painful pressure in the foreleg pits. While such a device restrains the animal, the designed restraining method is cruel as it causes severe and undesired pain to be inflicted upon the animal for control purposes.

Therefore, it would be highly desirable to have a new and improved animal restraining device which inhibits an animal from straining against a control leash without producing any choking or other painful action against the animal. Such a restraining device should be able to be quickly attached to the animal, and easily used by a small person, such as a child, to restrain even a large animal.

DISCLOSURE OF INVENTION

Therefore, the principal object of the present invention is to provide a new and improved animal restraint harness, which can be attached to a control leash, and which acts to inhibit the animal from straining against the control leash without producing any painful action against the animal.

Another object of the present invention is to provide such a new and improved animal restraint harness which can be easily and quickly attached to an animal.

Still yet another object of the present invention is to provide such a new and improved animal restraint harness which can be used by a small person, such as a child, to retrain even a large animal.

Briefly, the above and further objects of the present invention are realized by providing a new and improved animal restraint harness, which can be attached to a control leash and an animal to control the animal restrainably according to a novel method of using the harness.

An animal harness having a rectangularly shaped slotted plate or back engaging device for resting on the back of the animal, rearwardly of its forward shoulders and a single control strap adapted to be attached to a leash and for cooperating with pairs of rings for defining right and left foreleg slip loops. A pair of restraining straps pass through the rings and are coupled to the plate by a latching arrangement. The restraining straps cooperate with the slip loops to form a block and tackle arrangement which utilizes a pulling force exerted by the animal, to exert a restraining force across the upper foreleg muscles of the animal when the leash is held in a substantially stationary position.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is a pictorial view of an animal restraining harness which is constructed in accordance with the present invention and which is illustrated attached to an animal in a restraining position;

FIG. 2 is an enlarged fragmentary pictorial view of the foreleg of the dog illustrating a slip loop of FIG. 1 in the restraining position;

FIG. 3 is a fragmentary pictorial view of the animal restraining harness of FIG. 1 illustrated in a non-restraining position disengaged from the collar strap;

BEST MODE FOR CARRYING OUT THE INVENTION

Figure 4:
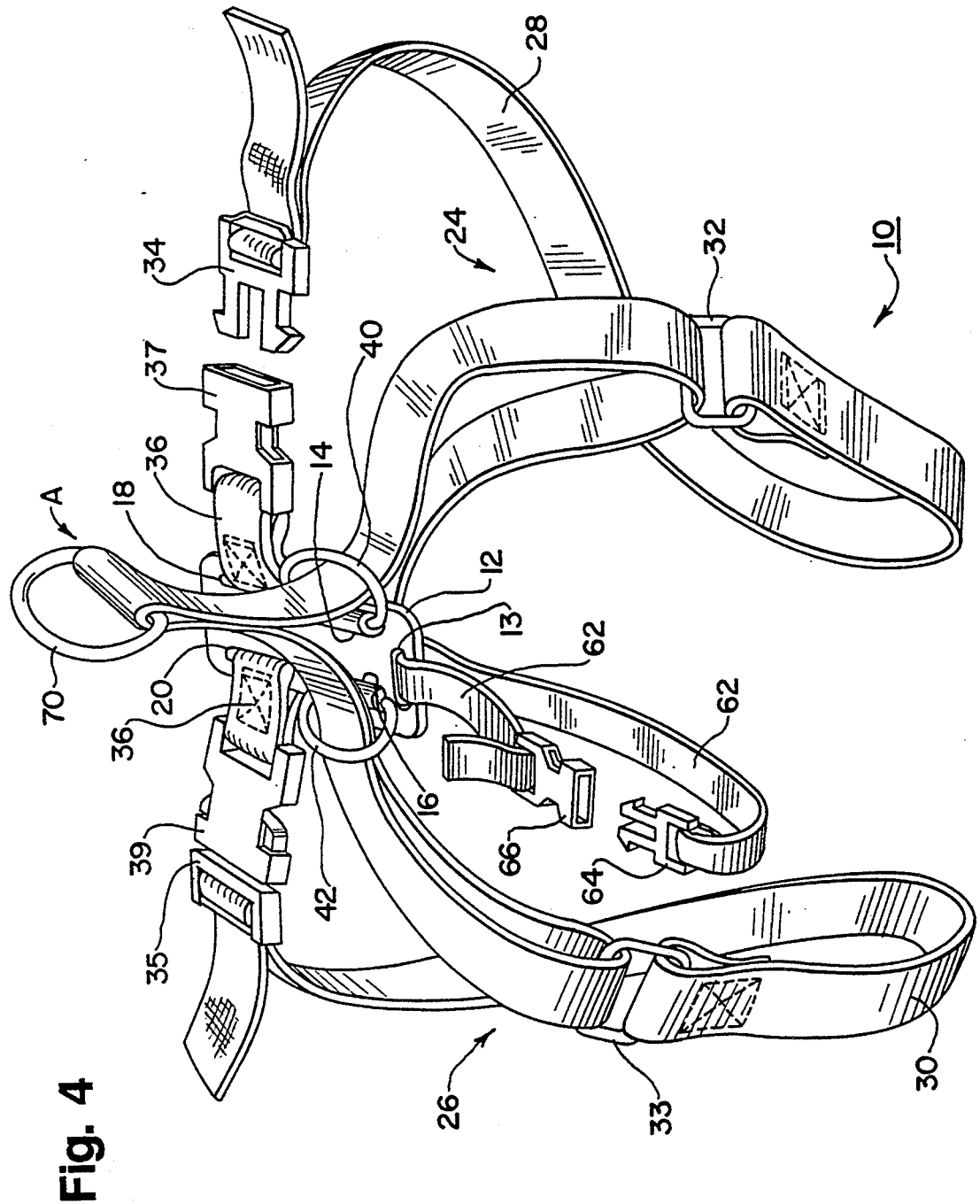
FIG. 4 is a pictorial view of the animal restraining harness of FIG. 1.
Figure 5:
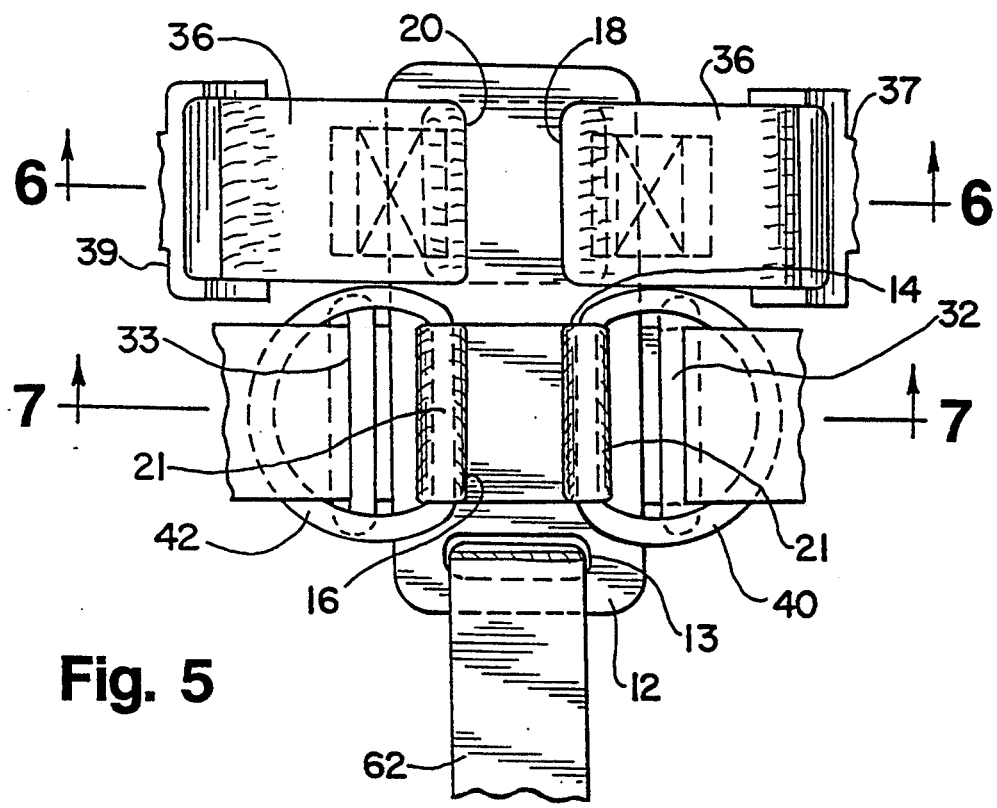
FIG. 5 is an enlarged top plan view of the restraining harness, illustrating a back engaging slotted plate of FIG. 1.
Figure 6:
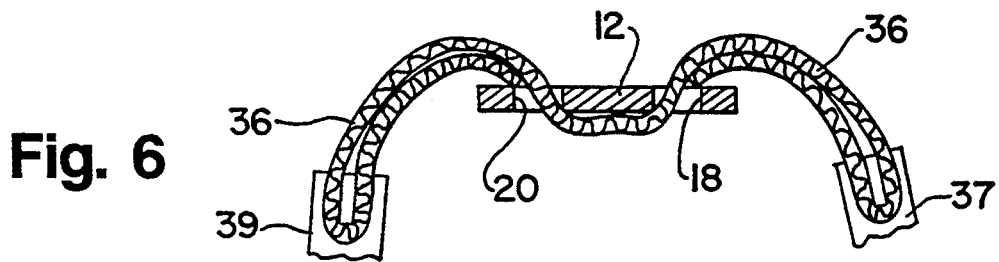
FIG. 6 is a cross sectional view of the back engaging slotted plate of FIG. 5, taken substantially along line 6—6.
Figure 7:
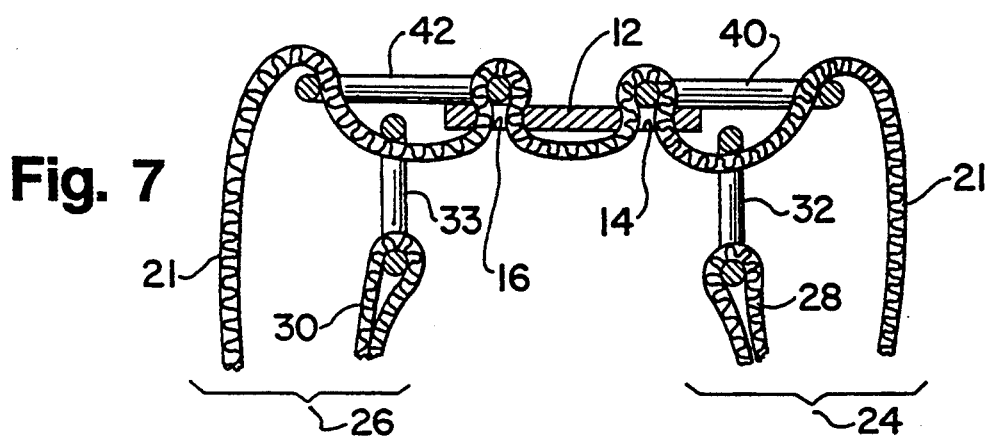
FIG. 7 is a cross sectional view of the back engaging slotted plate of FIG. 5 taken substantially along line 7—7.

Referring now to the drawings, and more particularly to FIGS. 1-4 thereof, there is shown an animal harness 10, which is constructed in accordance with the present invention. The harness 10 can be readily attached to a leash 11 for restraining animal foreleg movement in accordance with the method of the present invention.

The harness 10 generally comprises a generally rectangularly shaped slotted plate 12 having a forward traverse slot 13, and a pair of forward and rear longitudinal slots 14, 16 and 18, 20 respectively. The harness 10 also includes a single control strap 21 which pass through the forward slots 14 and 16 for forming a pair of foreleg slip loops, a right front slip loop 24 and a left front slip loop 26 respectively. A pair of restraining straps 28 and 30 which are adapted to cooperate with the slip loops 24 and 26 respectively are secured removably to the plate 12 for helping to restrain animal foreleg movement.

A ring 32 is secured to one terminal end of the restraining strap 28 for sliding engagement with the slip loop 24. The other terminal end of the restraining strap 28 is secured to a resilient compressible key 34 for coupling the restraining strap 28 to the plate 12 as will be explained hereinafter.

In a similar manner, a ring 33 is secured to one terminal end of the restraining strap 30 for sliding engagement with the slip loop 26. The other terminal end of the restraining strap 30 is secured to another resilient compressible key 35 for coupling the restraining strap 30 to the plate 12 as will be explained hereinafter.

In order to enable the restraining straps 28 and 30 to be coupled to the plate 12, the harness 10 also includes a single tackle strap 36 having a pair of latching members 37 and 39 disposed at opposite ends thereof. The tackle strap 36 is looped around the plate 12 through the rear slots 18 and 20 respectively, and thus, is fastened removably to the plate 12. In this regard, when the keys 34, 35 engage the respective latching members 37, 39, the tackle strap 36 is secured at its opposite ends to respective restraining straps 28 and 30.

To help define the slip loops 24 and 26, the harness 10 further includes a pair of rings 40 and 42 respectively. Ring 40 cooperates with the ring 32 to form the right front slip loop 24. In a similar manner, ring 42 cooperates with the ring 33 to form the left front slip loop 26.

Slip loops 24 and 26 are dimensioned to extend downwardly forwardly from the plate 12 across the respective right and left shoulders of an animal 8 to be restrained, thence through the respective rings 32 and 33 disposed on the chest of the animal adjacent to its right and left forelegs respectively and thence upwardly through rings 40, 42 respectively to a common point A which is adapted to be attached to the leash 11.

In use, the harness 10 is attached to the animal 8 by placing or positioning the plate 12 on the back of the animal behind its forward shoulders to help establish a mechanical advantage against a pulling force exerted by the animal. Next, the slip loops 24 and 26 are extended downwardly forwardly from the plate 12 across the respective right and left shoulders of the animal until the rings 32 and 33 are positioned on the chest of the animal adjacent to its right and left forelegs, respectively. The restraining straps 28 and 30 are then looped under the chest of the animal 8 and pulled rearwardly a sufficient distance to enable the respective resilient keys 34, 35 to engage the respective latching members 37, 39 extending from opposite ends of the tackle strap 36. In this regard, the slip loops 24 and 26 cooperate with the respective restraining straps 28 and 30 as well as the tackle strap 36 to form a block and tackle arrangement which provides a mechanical advantage over any pulling force exerted by the forelegs of the animal.

To enable a person, such as a small child, animal trainer or owner, to exercise a controlling restraint over the animal 8, such a person merely attaches the leash 11 to the common point A and holds the leash 11 in a fixed position by standing stationary. In this regard, when the animal attempts to exert a pulling force against the leash 11, the force exerted by the animal enables the slip loops 24 and 26 to be drawn upwardly and forwardly across the chest of the animal towards the plate 12. Simultaneously, the tackle strap and associated latching mechanisms 37, 39 causing the respective restraining straps 28 and 30 to be drawn tight against the lower chest of the animal and upwardly and across the upper foreleg muscles to lift the forelegs from their engagement with the ground, thus restraining the forward movement of the animal 8. As all of the lifting force is exerted by the animal 8, little counterforce is required by the person holding the leash 11. Thus, even a small person, such as a child, is able to control a large animal, such as a large dog.

It should be understood from the foregoing that the restraining strap is a large flat piece of material which slides along the underside of the chest of the animal and across the foreleg muscles to distribute the exerted force against the outside foreleg muscles for restraining purposes. Such a distributed force restrains the animal without causing the animal to experience unwanted and undesired pain, such as by choking or by lifting the animal upwardly by its foreleg pits.

Considering now the harness 10 in still greater detail with reference to FIGS. 1 and 2, the harness 10 is adaptable to be secured removably to a neck collar 60. In this regard, the harness 10 includes a collar strap 62 which is looped around the plate 12 via the slot 13, to fasten the strap 62 removably to the plate 12. A compressible key or attachment device 64 disposed on one of the terminal ends of the strap 62 is adapted to engage removably a latching mechanism 66 secured to the opposite terminal end of the strap 62. In this regard, when the strap 62 is passed under and over the neck collar 60, the device 64 is received in the latching mechanism 66, to secure removably the plate 12 to the collar 60.

Considering now the strap 21 in greater detail, as best seen in FIG. 2, the strap 21 is fastened together at the common point A to form a small loop around a leash receiving ring 70. The leash receiving ring 70 is adapted to be connected to the leash 11. In this regard, when a person controlling the leash 11 stands in a stationary position, the animal 8 will exert a pull which is directed upwardly through the ring 70 to the leash 11 causing the two slip loops 24 and 26 to be reduced sharply in their overall circumferences, thus applying a pressure across the back of the animal as well as the front foreleg muscles of the animal. This pressure is distributed substantially evenly across the width of the straps 21, 28 and 30 and causes the animal to be restrained until the pulling force is released by the animal.

In order to provide a more limited form of restraint for training purposes or the like, instead of attaching the leash 11 to the ring 70, the leash can be attached directly to both rings 40 and 42.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An animal harness for use with a control leash, comprising:
   block and tackle means for helping to provide a mechanical advantage over a pulling force exerted against the control leash;
   said block and tackle means including left front movable slip loop means for helping to establish a portion of said mechanical advantage, said left front movable slip loop means being fixed at one of its terminal ends; right front movable slip loop means for helping to establish another portion of said mechanical advantage, said right front movable slip loop means being fixed at one of its terminal ends; tackle strap means for securing fixedly together said left front movable slip loop means and said right front movable slip loop means at one of their respective terminal ends; ring means engaging said left front movable slip loop means at its other terminal end and said right front movable slip loop means at its other terminal end and adapted to be coupled to the control leash for enabling a person to control an animal restrainably; and restraining strap means adapted to be attached to the control leash and coupled to said ring means for enabling said left front movable slip loop means to move towards and away from its fixed terminal end and for enabling said right front movable slip loop means to move towards and away from its fixed terminal end to help restrain unwanted animal movements.

2. An animal harness according to claim 1, wherein said left front movable slip loop means includes:
   left slip loop strap means for helping to establish a mechanical advantage against a pulling force exerted by the left foreleg of an animal; and
   said left slip loop strap means secured at one of its ends rearwardly of the forward shoulders of the animal and secured movably at another one of its ends to said ring means for enabling an upwardly forwardly force to be exerted against the left foreleg of the animal to substantially restrict left foreleg movement when the leash is held in a substantially stationary position relative to the pulling force exerted by the animal.

3. An animal harness according to claim 2, wherein said left slip loop strap means is a slip strap.

4. An animal harness according to claim 2, wherein said right slip loop strap means is a slip strap.

5. An animal harness according to claim 1, wherein said right front movable slip means includes:
   right slip loop strap means for helping to establish a mechanical advantage against a pulling force exerted by the right foreleg of an animal; and
   said right slip loop strap means secured at one of its ends rearwardly of the forward shoulders of the animal and secured movably at another one of its ends to said ring means for enabling an upwardly forwardly force to be exerted against the right foreleg of the animal to substatially restrict right foreleg movement when the leash is held in a substantially stationary position relative to the pulling force exerted by the animal.

6. Using a restraining device according to claim 1, to restrain a four-legged animal.

7. A restraining device for controlling an animal with a control leash, comprising:
   back engaging plate means for helping to establish a mechanical advantage, said back engaging plate means resting in a substantially stationary position on the back of the animal rearward of its forward shoulders;
   single strap means fastened to said back engaging plate means for attachment to the control leash; and
   pulley means engaging said single strap means for further helping to establish a mechanical advantage;
   whereby when the control leash is held in a substantially stationary position relative to animal unwanted animal movement is substantially restrained.

8. A restraining device according to claim 7, wherein said single strap means includes a right side portion for defining a movable right front slip loop for helping to restrict right foreleg movement of the animal to be retrained;
   said single strap means further having a left side portion for defining a moveable left front slip loop for helping to restrict left leg movement of the animal to be restrained;
   right foreleg restraining means attached fixedly to a right rear portion of said back engaging plate means for engaging movably said right front slip loop for pulling up on the right foreleg muscle of the animal to substantially restrict right foreleg movement when the leash is held in a substantially stationary position relative to the pulling force exerted by the animal; and
   left foreleg restraining means attached fixedly to a left rear portion of said back engaging plate means for engaging movably said left front slip loop for pulling up on the left foreleg muscles of the animal to substantially restrict left foreleg movement when the leash is held in a substantially stationary position relative to the pulling force exerted by the animal.

9. A restraining arrangement according to claim 8, wherein said right side portion commences at a back attachment point adjacent to the leash, thence downwardly forwardly extending across the right shoulder of the animal to a right attachment point adjacent to the chest and right foreleg of the animal and thence upwardly rearwardly to said back attachment point adjacent to the leash; and
   wherein said left side portion commences at said back attachment point adjacent to the leash, thence downwardly forwardly extending across the left shoulder of the animal to a left attachment point adjacent to the chest and left foreleg of the animal and thence upwardly rearwardly to said back attachment adjacent to the leash.

10. A restraining device according to claim 7, wherein said back engaging plate means is slotted plate means.

11. A restraining device according to claim 10, wherein said slotted plate means includes means defining a pair of front slots and means defining a pair of rear slots.

12. A restraining device according to claim 11, wherein said single strap means is looped through said front slots for fastening removably said single strap means to said plate means.

13. A restraining device according to claim 11, wherein said right foreleg restraining means includes single tackle strap means.

14. A restraining device according to claim 13, wherein said single tackle strap means loops through said rear slots for fastening removably said single tackle strap means to said plate means.

15. Using a restraining device according to claim 7, to restrain a four-legged animal.

16. A restraining device according to claim 7, further comprising:

collar attachment means attached to one of the collar and the plate means for securing removably said plate means to the animal collar.

17. An animal restraining hardness, comprising:

plate means adapted to rest on the back of the animal adjacent to its forward shoulders for helping to establish a mechanical advantage against a pulling force exerted by the animal;

restraining strap means secured removably to said plate means and being adapted to enabling a person to restrict undesired leg movement by the animal;

means attached to said restraining means for further helping to establish said mechanical advantage against the pulling force exerted by the animal;

strap means looped around the last-mentioned means and being anchored to said plate means for effectuating movement of said restraining means when said pulling force is exerted against said restraining strap means;

said restraining strap means and said strap means forming a pair of loops, each loop extending downwardly from the back of the animal under its rib cage, thence forwardly behind the leg and upwardly adjacent the chest and thence rearwardly to said plate means;

said restraining strap means being pulled upwardly forwardly under said pulling force when a portion of said strap means is held in a substantially stationary position by said person to prevent forward movement of the animal;

whereby said restraining strap means spreads a restraining force across the area of said plate mean and against the upper forelegs of the animal to substantially restrict foreleg movement until the animal reduces said pulling force a sufficient amount to substantially prevent said restraining strap means from being pulled upwardly forwardly via said means attached to said restraining means.

* * * * *